United States Patent [19]

Restori et al.

[11] 4,145,618

[45] Mar. 20, 1979

[54] ARRANGEMENT FOR PROVIDING AUXILIARY ENERGY SOURCE FOR STATIC INVERTER USED WITH TRACTION MOTOR DRIVE DURING POWER INTERRUPTION

[75] Inventors: Ettore Restori; Giuseppe Careglio, both of Turin, Italy

[73] Assignee: WABCO Westinghouse, Turin, Italy

[21] Appl. No.: 833,528

[22] Filed: Sep. 15, 1977

[51] Int. Cl.² .............................................. H02J 9/00
[52] U.S. Cl. ........................................ 307/64; 320/1; 307/9
[58] Field of Search .................... 307/23, 64, 66, 9, 72, 307/51, 85, 56, 74, 146; 320/1; 363/45, 46, 47, 34, 37; 191/2, 66; 322/60; 340/333

[56] References Cited

U.S. PATENT DOCUMENTS

| | | | |
|---|---|---|---|
| 3,262,018 | 7/1966 | Bogaerts et al. | 307/64 |
| 3,784,841 | 1/1974 | Hosaka | 307/72 |
| 4,041,324 | 8/1977 | Tashiro et al. | 307/9 |

Primary Examiner—Robert K. Schaefer
Assistant Examiner—Morris Ginsburg
Attorney, Agent, or Firm—R. W. McIntire, Jr.

[57] ABSTRACT

A high voltage power supply system for energizing a static inverter, in which an auxiliary circuit provides a source of reserve energy to sustain inverter operation during periods of power interruption. In the auxiliary circuit, there is provided a capacitance normally charged from the source of power (catenary) via a resistance whose ohmic value assures a slow rate of charge to avoid blowing the input fuse in the event of a short in the auxiliary circuit capacitance and to permit use of the desired capacitance with a reduced voltage rating. A diode arrangement statically connects the higher of the catenary voltage or the stored energy reserve of the auxiliary circuit to the inverter.

2 Claims, 3 Drawing Figures

ARRANGEMENT FOR PROVIDING AUXILIARY ENERGY SOURCE FOR STATIC INVERTER USED WITH TRACTION MOTOR DRIVE DURING POWER INTERRUPTION

BACKGROUND OF THE INVENTION

The present invention relates to power supply systems in which a static inverter is employed to convert power taken from a high voltage catenary to the proper form for a traction motor drive, such as may be employed on a railway vehicle.

A disadvantage of known static inverters used in traction motor drives is that a momentary loss of power may render the inverter disabled if the interruption exceeds the duration a filter capacitor at the inverter input can provide a supply of stored energy, which is minimal. Such interruptions of power are relatively frequent where a pantograph is employed to draw power from a cantenary, and require each time that a resetting and restarting operation be followed.

Obviously, this cannot be tolerated in high density operation where close schedules must be maintained and is even disturbing to passengers from the standpoint of comfort and safety.

In the use of a rotating inverter, such as a d.c. motor set and an alternator, energy stored in the motor rotor is utilized to sustain a supply of power to the traction motors and other auxiliary equipment when the pantograph is momentarily disengaged. In having a large energy reserve available, the rotating inverter does not suffer from the disadvantages of a static inverter, as noted above.

A static inverter of the conventional type, as shown in FIG. 1, does have an energy reserve in the form of inductances L and capacitances C comprising the inverter input filter, but the capacity of this energy reserve is considerably less than the energy reserve $J_M$ of a rotating inverter and not sufficient to sustain inverter operation for any appreciable time. The energy reserve provided by the capacitances representing all the capacities of the static inverter input filter may be denoted as $J_c = \frac{1}{2} Cr\ V^2$; while the energy reserve provided by the inductances of the input filter may be denoted as $J_l = \frac{1}{2} L \cdot i^2$.

It appears, therefore, that a solution to the problem of providing a sufficiently large energy reserve for a static type inverter is to increase $(J_L + J_C)$ to the level of $J_M$ of the rotating inverter, as by increasing the values of the input filter inductances and capacitances. Such an increase in these values is not practical, however, for the following reasons:

(a) The capacitance C and inductance L are connected directly to the catenary and therefore would need to be insulated and sized in accordance wth the maximum voltage on the catenary (approx. 12,000 v.), which would be too costly.

(b) The maximum charging current $I = (E/\sqrt{L/C})$ of the input filter would be so high if the capacitances C were appreciably increased that the input fuse would be blown.

(c) If the inductance L were increased, excessive voltages and arcing would occur at the capacitances C and thus at the inverter terminals upon separation of the loads, and would further result in a substantial weight increase of the input filter, which is already considerable.

SUMMARY OF THE INVENTION

The object of the present invention, therefore, is to provide an auxiliary circuit capable of providing an energy reserve in the form of additional capacitance separate from the capacitance of the input filter to avoid the disadvantages pointed out above.

In addition to the added capacitance, the auxiliary circuit further comprises resistance via which the capacitance is charged at such a slow rate as to avoid blowing the input fuse. Moreover, this resistance drops the voltage so that the added capacitance need not be large in size and thus not excessively costly.

BRIEF DESCRIPTION OF THE DRAWINGS

In the drawings to which the following more detailed description refers.

DESCRIPTION AND OPERATION

Figure 1:
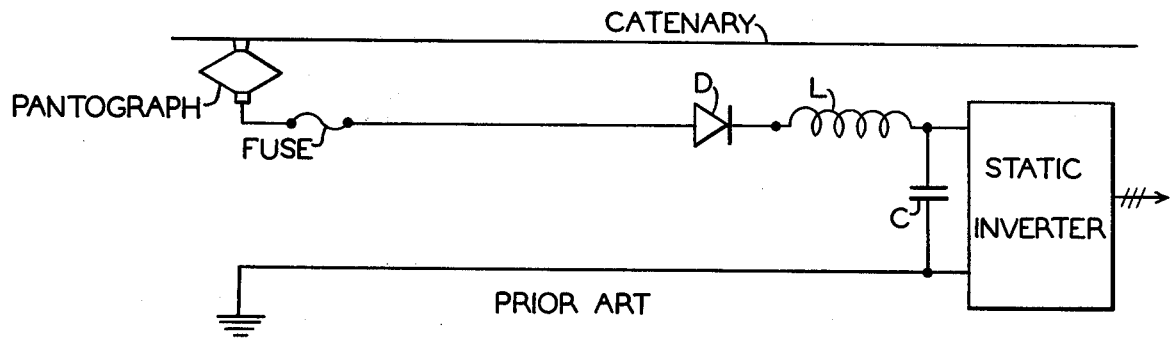
FIG. 1 shows a conventional arrangement for supplying high voltage power to a static inverter.
Figure 2:
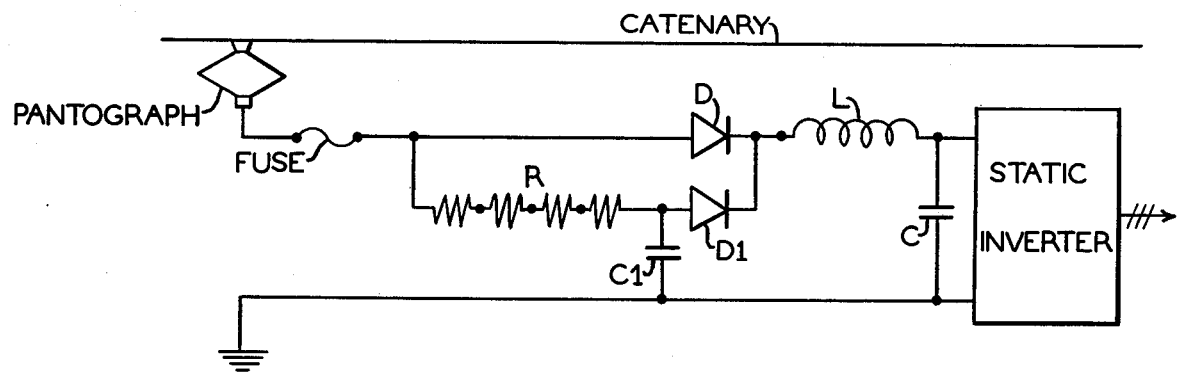
FIG. 2 shows a form of the invention in which an auxiliary circuit is added to the arrangement of FIG. 1.

Referring to FIG. 2, there is shown, in addition to the conventional circuit of FIG. 1, an auxiliary circuit including a resistance R having one terminal connected between the input fuse and the anode terminal of diode D and the other terminal connected to a capacitance $C_1$ and the anode terminal of a diode $D_1$ of the auxiliary circuit. The cathode terminal of diode $D_1$ is connected to the cathode terminal of diode D. Diodes D and $D_1$ act as an OR gate in that they pass the higher of either the voltage collected by the vehicle pantograph or the voltage stored in capacitor $C_1$.

During engagement of the vehicle pantograph with the catenary, high voltage D.C. power is supplied to the static inverter via diode D and the input filter formed by capacitance C and inductance L. During this period of normal operation, capacitance $C_1$ is also charged from the catenary D.C. voltage via resistance R, the rate of charge being very slow because of the high ohmic value of the resistance.

In the event the vehicle pantograph becomes momentarily disengaged from the catenary, e.g., when traversing a line gap at the junction of another catenary or where snow, ice or the like has formed on the catenary, the supply of high voltage power via diode D is immediately lost, allowing the energy previously stored in capacitance $C_1$ to be connected to the static inverter via diode $D_1$ and the inverter input filter. This energy stored by capacitance $C_1$ is sufficient to sustain inverter operation for a considerable period of time, which may be in the order of minutes.

When continuity is restored between the pantograph and catenary, high voltage power from the catenary is again supplied to the inverter via diode D and at the same time begins to recharge capacitor $C_1$. While the charging rate of capacitor $C_1$ is extremely slow, due to resistance R, it will be appreciated that the pantograph is only momentarily disengaged, being normally in full engagement with the catenary for prolonged periods of time between disengagements. It will be further appreciated that the slow charging rate protects the input fuse in the event a short circuit develops in capacitance $C_1$, whose required size in providing the desired auxiliary circuit capacitance is relatively small because of the low voltage appearing at the output of resistance R.

Figure 3:
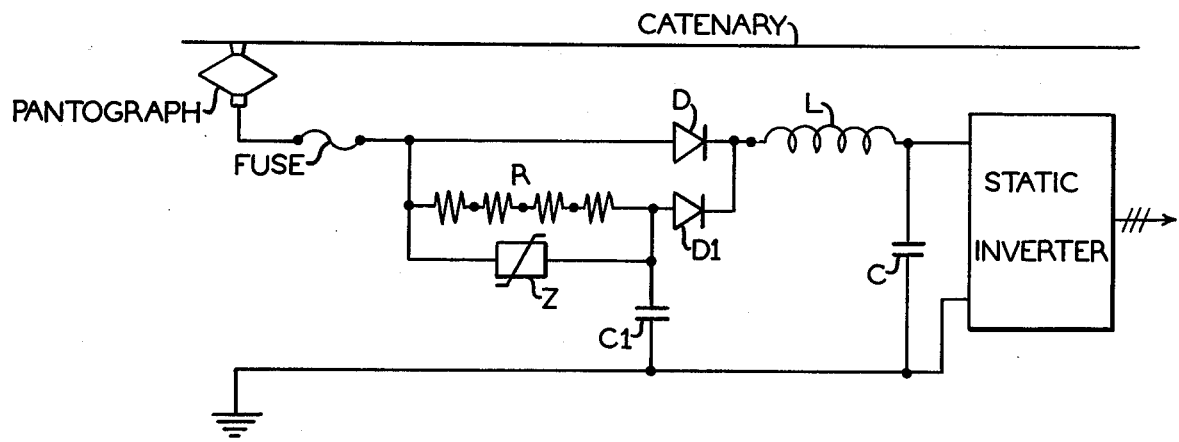
FIG. 3 shows a further modified form of the arrangement of FIG. 2.

In the modified arrangement of the invention shown in FIG. 3, a voltage overflow device Z, commonly known as a varistor, is placed in the auxiliary circuit in parallel with resistance R. Since the nature of a varistor is to decrease its ohmic value as the input voltage increases, it will be apparent that energy surges at the high voltage catenary will be directed via varister Z to capacitance $C_1$ to aid in the charging thereof, while more importantly limiting the amplitude of the high voltage surges.

Having now described the invention, what we claim as new and desire to secure by Letters Patent, is:

1. A power supply system for a traction vehicle including a static inverter to which energy is normally supplied from a high voltage catenary via the vehicle pantograph, an input filter formed in part by capacitor means for smoothing voltage surges in the high voltage supplied to said inverter, fuse means between the input filter and vehicle pantograph, a first diode between said fuse means and said input filter, and an auxiliary circuit in parallel with said first diode comprising:

(a) a second diode having its cathode connected to the cathode of said first diode;
   (b) resistance means connected between the anodes of said first and second diodes;
   (c) an auxiliary capacitor connected between said resistance means and said second diode so as to be charged from said high voltage catenary via said resistance means, the value of said resistance means being such as to prevent interruption of the supply of power to said inverter by said fuse means in the event of a short circuit of said auxiliary capacitor and to permit the size of said auxiliary capacitor to be selected in accordance with a maximum voltage less than the maximum voltage of said catenary, said auxiliary capacitor being discharged via said second diode during an interruption of power supplied via said vehicle pantograph; and
   (d) voltage control means in parallel with said resistance means for dissipating catenary overvoltages via said auxiliary capacitor.

2. The system as recited in claim 1, wherein said voltage control means comprises a varistor, said varistor having a resistance value that varies indirectly with changes in voltage thereat.

* * * * *